(12) United States Patent
Renders et al.

(10) Patent No.: US 7,327,524 B2
(45) Date of Patent: Feb. 5, 2008

(54) ELECTROWETTING MODULE

(75) Inventors: Christina Adriana Renders, Eindhoven (NL); Stein Kuiper, Eindhoven (NL); Bernardus Hendrikus Wilhelmus Hendriks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 97 days.

(21) Appl. No.: 10/555,261

(22) PCT Filed: May 3, 2004

(86) PCT No.: PCT/IB2004/050568

§ 371 (c)(1),
(2), (4) Date: Nov. 1, 2005

(87) PCT Pub. No.: WO2004/099844

PCT Pub. Date: Nov. 18, 2004

(65) Prior Publication Data

US 2006/0215274 A1    Sep. 28, 2006

(30) Foreign Application Priority Data

May 6, 2003   (EP) ................................. 03076375
Aug. 13, 2003  (EP) ................................. 03102520

(51) Int. Cl.
*G02B 1/06* (2006.01)
*G02B 3/12* (2006.01)

(52) U.S. Cl. ...................... 359/666; 359/665
(58) Field of Classification Search ............. 359/665, 359/666
See application file for complete search history.

(56) References Cited

U.S. PATENT DOCUMENTS

| 4,030,813 | A  | * | 6/1977 | Kohashi et al. ............. 359/245 |
| 4,384,761 | A  |   | 5/1983 | Brady et al. |
| 5,541,776 | A  |   | 7/1996 | Kobayashi et al. |
| 7,242,528 | B2 | * | 7/2007 | Renders et al. ............. 359/665 |
| 2001/0017985 | A1 | | 8/2001 | Tsuboi et al. |
| 2003/0048541 | A1 | | 3/2003 | Kroupenkine et al. |

FOREIGN PATENT DOCUMENTS

| WO | 03069380 A1   | 8/2003 |
| WO | 2004027489 A1 | 4/2004 |
| WO | 2004027490 A1 | 4/2004 |
| WO | 2004038480 A1 | 5/2004 |

OTHER PUBLICATIONS

ISR: PCT/IB2004/050568.
Written Opinion: PCT/IB2004/050568.
B.Berge et al; "Variable Focal Lens Controlled by an External Voltage: An Application of Electrowetting", The European Physical Journal, pp. 159-163, XP002285977.

* cited by examiner

*Primary Examiner*—David N. Spector
(74) *Attorney, Agent, or Firm*—Michael E. Belk

(57) ABSTRACT

An electrowetting module (20) comprises a fluid chamber (8) which contains a first fluid (A) and a second fluid (B), which are separated by an interface (14), and means to (16,17) exert a force on at least one of the fluids to change the position and/or shape of the interface. By providing at least one of the fluids with a compound having at least one aromatic, non-fused, residue, the performance of the module can be enhanced. For example the optical power of an electrowetting lens (30) can be increased.

18 Claims, 2 Drawing Sheets

ELECTROWETTING MODULE

The invention relates to an electrowetting module, comprising a fluid chamber, which contains at least a first body of a first fluid and a second body of a second fluid, said bodies being separated by an interface, and means for exerting a force on at least one of the bodies to change the position and/or shape of the interface.

It is observed that wetting techniques make it possible to manipulate a volume of a fluid along a predetermined path. With these techniques, the surface tension of said volume is locally altered (usually reduces), causing the volume to flow in the direction of its lowest surface tension.

Further, it is observed that a fluid is a substance that alters its shape in response to any force, and includes gases, vapors, liquids and mixtures of solids and liquids, capable of flow.

The term "wettability" of a surface by a certain fluid gives an indication of the ease with which said fluid may wet said specific surface, which may for instance depend on the nature of and/or the electric potential across said surface. If a surface has a "high wettability" by a specific fluid, this indicates that a droplet of said fluid in contact with said surface will have a rather expanded shape, with a relatively large contact area and a relatively small contact angle, usually less than about 90°. "Low wettability" indicates that the droplet in contact with said surface will have a rather contracted shape, with a relatively small contact area and a relatively large contact angle, usually exceeding about 90°.

The term "wetting" is understood to encompass all techniques causing the surface tension of a volume, e.g. a droplet of a specific fluid to be locally varied, so as to influence the wetting behavior of said fluid with respect to a specific surface.

In modules wherein use is made of the wettability phenomenon, it is necessary that the two fluids have desired properties, for example: densities as close as possible; low melting points; adapted viscosity; good electrowetting behavior; non poisonous; and, in case of an optical module, indices of refraction of a certain predetermined difference.

An example of such an optical module is an electrowetting-based lens, also called an electrowetting lens, of which the focal distance can be changed. In an electrowetting lens the interface between the two fluid bodies is a meniscus. In such a module the first fluid body is an electrically conducting and/or polar liquid and the second fluid body is an electrically non-conducting liquid. The first liquid is, for example salted water and the second liquid is, for example an organic non-polar, water-inmiscible liquid such as bromo-decane, chloro-or bromonaphtalene and silicone oil. The electrowetting optical module is provided with means for exerting an electrical force by means of which the shape and or the position of the meniscus can be shaped. Other examples of the electrowetting optical module are zoom lenses, diaphragms, diffraction gratings, filters and beam deflectors. Embodiments of these modules are described in PCT patent application no. IB03/00222 and in European patent applications nos. 020789309.2, 02080387.0 and 02080060.3. The electrowetting optical modules are very compact and may therefore be used with much advantage in devices, like optical disc scanning devices, mini cameras for a/o mobile phones, displays etc.

The optical power of an optical electrowetting module is determined by the curvature of the meniscus and the difference between the refractive index of the first liquid and that the second liquid. There is a growing demand for optical electrowetting modules, which can produce large optical power variations. Since the maximum change in curvature of the meniscus is determined by the size of the electrowetting cell, the change in optical power that can be realized by change the curvature is limited for a given electrowetting lens. The problem of increased power thus should be solved in another way.

Another electrowetting module is a motor which uses the electrowetting effect to manipulate a volume of fluid along a predetermined path, which fluid causes two motor elements to move relative to each other, as will be described later on. In such a motor one of the fluids may be flattened due to centrifugal forces, if the densities of the first fluid and of the second fluid are not matched to each other.

It is an object of the invention to provide an electrowetting module as defined in the opening paragraph, which module, if used as an optical module, allows varying the optical power over a larger range and, if used in a motor, is considerably less sensitive to flattening of one of the fluids. The electrowetting module is characterized in that at least one of the fluids comprises a compound having at least one aromatic, non-fused, residue.

This electrowetting module is based on the insight that such a compound, when used as or when included in the non-conductive, or non-polar, fluid or liquid, increases the refractive index of this fluid or liquid so that the difference between the refractive indices of the non-conductive and of the conductive fluids in an electrowetting optical module is increased. In this way the optical power and the range of power variation can be increased. If the said compound is used as or included in the non-polar fluid in an electrowetting motor, it prevents flattening of the fluid.

Another aspect of the invention is that for an optical module the curvature of the meniscus can be decreased while maintaining the optical power. In this way the sensitivity for optical aberrations of the module can be reduced. Moreover the actuating voltage needed for a required change in the optical power can be reduced.

It is remarked that an electrowetting lens with fluid bodies showing an increased refractive index difference is disclosed, for example by B. Berge and J. Peseux in Eur. Phys. J. E3, 159-163 (2000). The fluid bodies of this lens consist of water and chloronaphtalene respectively. These lens, however do not show good electrowetting behavior, especially not for DC voltages.

A group of compounds has been traced, which provide fluid or liquids with refractive indices and/or densities which are larger than known fluids and thus are very suitable to be used as or to be included in at least one of the fluids of the electrowetting module of the invention.

A module comprising such a compound may be configured as an optical component, the first and said second fluid body having different refractive indices. In such an optical module the compound added to one of the fluids has an refractive index difference increasing effect.

In such a module the first fluid body may be electrically conducting and/or polar, and the second fluid body may be electrically non-conducting and the module may be provided with means for exerting an electric force to change the position and/or shape of the meniscus-shaped interface.

The difference in refractive index is from 0,1 to 0,3, preferably from 0,1 to 0,2; the refractive index of said second, non-conducting body being larger than 1.4, preferably greater than 1.5.

Preferably the first and second fluid bodies show a substantially similar density.

The module may also be provided with means for exerting a pressure to change the position of the interface These and other aspects of the invention will be apparent from and elucidated by way of non-limitative example with reference to the embodiments described hereinafter and illustrated in the accompanying drawings.

Figure 1:
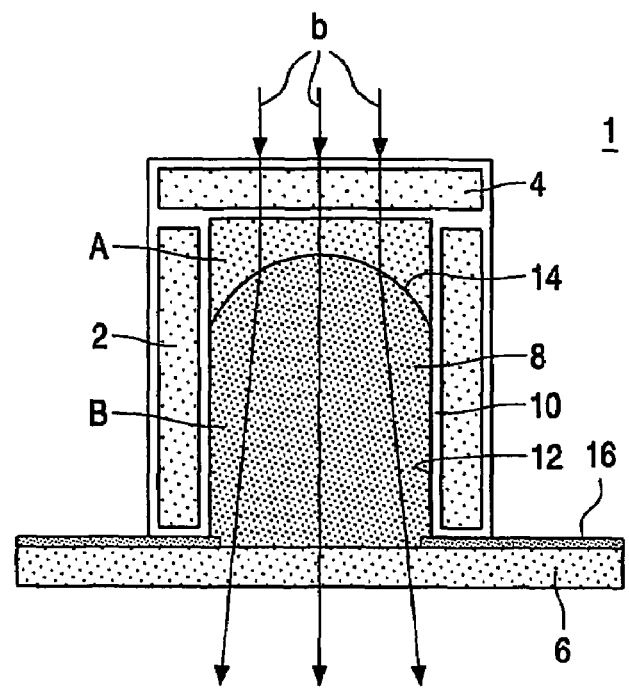
FIG. 1 shows, in a cross-section through its optical axis, a known electrowetting lens in a non-activated state.

FIG. 1 shows an electrowetting module constituting a variable focus lens. The element comprises a first cylindrical electrode 2 forming a capillary tube, sealed by means of a transparent front element 4 and a transparent rear element 6 to form a fluid chamber 8 containing two fluids. The electrode 2 may be a conducting coating applied on the inner walls of a tube.

In this embodiment of the electrowetting module the two fluids consist of two non-miscible liquids in the form of an electrically insulating first liquid A, currently, for example a silicone oil or an alkene, and an electrically conducting second liquid B, currently, for example, water containing a salt solution. The first fluid A has a higher refractive index than the second fluid B.

The first electrode 2 is a cylinder of inner radius typically between 1 mm and 20 mm. This electrode is formed of a metallic material and is coated by an insulating layer 10, formed for example of parylene. The insulating layer has a thickness of between 50 nm and 100 μm. The insulating layer is coated with a fluid contact layer 12, which reduces the hysteresis in the contact angle of the meniscus 14, i.e. the interface between the fluids A and B, with the cylindrical wall of the fluid chamber. The fluid contact layer is preferably formed from n amorphous fluorocarbon such as Teflon™ AF1600 produced by DuPont™. The fluid contact layer 12 has a thickness between 5 nm and 50 μm.

A second, annular, electrode 16 is arranged at one side of the fluid chamber, in this case, adjacent the rear element 6. The second electrode is arranged with at least one part in the fluid chamber such that the electrode acts on the second fluid B.

The two fluids A and B are non-miscible so as to tend to separate into two fluid bodies separated by a meniscus 14. When no voltage is applied between the first and second electrodes, the fluid contact layer 12 has a higher wettability with respect to the first fluid A than with respect to the second fluid B. FIG. 1 shows this lens configuration, i.e. the non-activated state of the electrowetting lens. In this configuration, the initial contact angle θ between the meniscus and the fluid contact layer 12, measured in the fluid B, is larger than 90°. Since the refractive index of the first fluid A is larger than the refractive index of the second fluid B, the lens formed by the meniscus, here called meniscus lens, has a negative power in this configuration.

Figure 2:
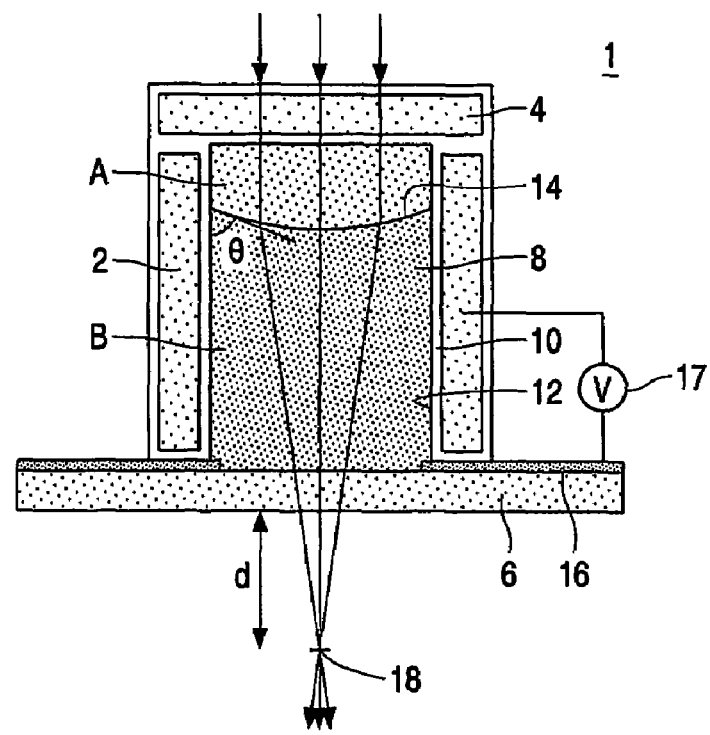
FIG. 2 shows such a lens in an activated state.

Due to electrowetting, the wettability by the second fluid B varies under the application of a voltage between the first electrode and the second electrode, which tends to change the contact angle. FIG. 2 shows the lens configuration if such a voltage from a source 17 is supplied to the lens, i.e. if the lens is in the activated state. In this case the voltage is relatively high, for example between 150V and 250V. and the meniscus has now a convex shape. The maximum contact angle θ between the meniscus and the fluid contact layer 12 is, for example of the order of 60°. Since the refractive index of fluid A is larger than fluid B, the meniscus lens I in this configuration has a positive power and it focuses an incident beam b in a focal spot 18 at a certain distance d from the lens.

For further details about the construction of the variable focus lens reference is made to international patent application no. IB03/00222. A zoom lens, which comprises at least two independently controllable interfaces between a higher refractive index liquid and lower refractive index fluid, is described in the European patent application no. 02079473.1 (PHNL021095)

In an electrowetting lens the optical power of the lens depends on the curvature of the meniscus and the difference in refractive indices between the conductive and non-conductive liquids, as can be seen in the following equation:

$$S = n_1 - n_2/r$$

Wherein S is the optical power of the meniscus lens, r the radius of curvature of the meniscus, $n_2$ the refractive index of the non-conductive liquid A and $n_1$ the refractive index of the conductive liquid B.

In practice there is a need to increase the range in which the power of a variable focus lens can be varied. For example, for a zoom lens based on electrowetting the maximum attainable zoom factor is strongly related to the maximum attainable change in optical power of individual electrowetting lenses of such a zoom lens.

From the above equation follows that the optical power change of an electrowetting lens depends on the difference in refractive indices between the conducting and non-conductive liquids and on the change in curvature of the meniscus. Since the maximum change in curvature is determined by the size of the electrowetting cell, the change in optical power caused by change in curvature is limited for a given electrowetting lens. Moreover a strong curvature of the meniscus introduces optical aberrations in the beam passing the electrowetting lens and requires a high control voltage. A larger optical power change can be achieved by enlarging the difference in refractive index between the conductive liquid and the non-conductive liquid. The non-conductive liquids currently used in electrowetting lenses (e.g. alkanes or silicone oils) have a refractive index (n=1, 37-1,43) that is only slightly larger than the refractive index of the currently used conductive liquids (e.g. water, n=1,33). Typically the difference in refractive index is below 0,1.

According to the present invention at least one compound, which has at least one aromatic, non-fused, residue, preferably at least one phenyl group is used as the non-conducting, or non-polar, liquid or solution A, or as a component in this liquid or solution. This measure increases the refractive index in the liquid A substantially, whilst the other requirements for the liquid, such as high transparency, non-miscibility with the other liquid or fluid B and a good electrowetting behavior still can be satisfied.

This measure can be used to increase the range of power variations of a variable focus electrowetting lens having a given meniscus curvature or to reduce meniscus curvature of a variable focus lens having a given range of power variations. If used in an electrowetting zoom lens, the measure allows increasing the zoom factor. By not-increasing or decreasing the meniscus curvature the sensitivity for optical aberrations in the optical system of which the electrowetting lens forms is not increased or decreased, respectively. Moreover, the required actuation voltage to achieve a certain change in optical power is lower.

Figure 3:
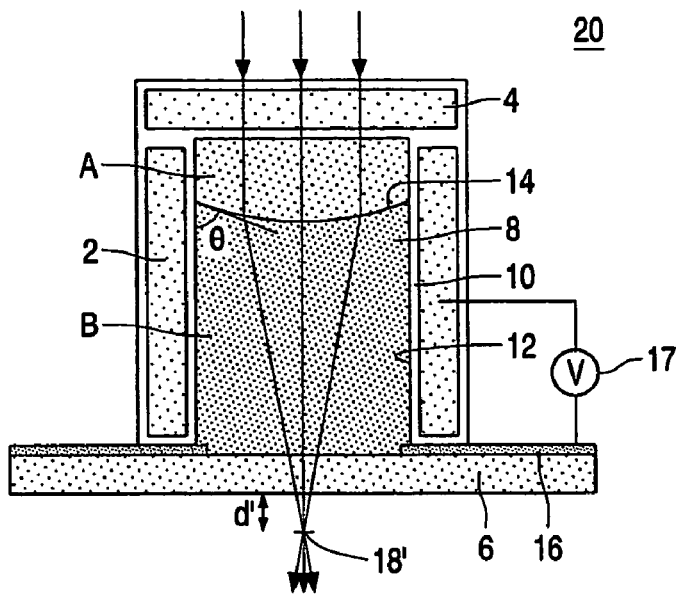
FIG. 3 shows a lens according to the invention in an activated state.

FIG. 3 shows an electrowetting lens 20, which has the same construction and configuration as the lens of FIG. 2, but is provided with a non-conducting fluid A' that comprises the said compound having at least one aromatic non-fused residue, instead of the fluid A of FIG. 2. The result of the replacement of fluid A by fluid A' supplying to the lens 20 a control voltage that has the same level as the voltage supplied to the lens 1 of FIG. 2 is in the same and maintaining the level is that the focal spot 18' is situated at a distance d' from the lens, which is smaller than the distance d in FIG. 2.

For electrowetting lenses in general it is important that the meniscus shape is independent of orientation and thus of gravity. The shape will be perfectly spherical and independent of orientation if the densities of the liquids are equal. This requirement can also be satisfied in the electrowetting lens according to the invention.

A number of compounds have been traced which, if used in or as a component of the non-conducting fluid in an electrowetting lens, provide the required properties: high refractive index, transparent, non-miscible with the conducting fluid, a density substantially similar to that of the conductive fluid (i.e. a small difference between the densities is allowed), proper melting and boiling points and a good electrowetting behavior. Examples of non-conductive liquids or soluble solids containing phenyl groups, which are very suitable to be used with the invention are given in Table 1:

TABLE 1

| Material | State | Density | Refractive Index |
|---|---|---|---|
| Toluene | Liquid | | 1.496 |
| Diphenylmethane | Solid $T_m = 22°$ C. | | 1.577 |
| Biphenyl | Solid | | 1.588 |
| Phenyltrimethylsilane | Liquid | | 1.4908 |
| 1,3,3,5-tetraphenyldimethyldisiloxane | Solid | | 1.5866 |
| 1,1,5,5-tetraphenyl-1,3,3,5-tetramethyltrisiloxane | Liquid | 1.07 | 1.551 |
| 1,1,3,5,5-pentaphenyl-1,3,5-trimethyltrisiloxane | Liquid | 1.093 | 1.5797 |
| Triphenyltrimethylcyclotrisiloxane | Liquid | 1.102 | 1.5402 |
| 3,5,7-triphenylnonamethylpentasiloxane | Liquid | 1.144 | 1.501 |
| Reference Material: | | | |
| Octamethyltrisiloxane | | 0.82 | 1.38 |

From Table 1 it follows that the selected compounds with phenyl groups have refractive indices typically larger than 1,49, making them suitable for electrowetting lenses with large optical power range. Preferably, the subset with a refractive index greater than 1,5 is particularly suited because they allow miniaturized zoom lenses for portable applications (for instance mobile phone) with a zoom factor greater than two. Even more preferred are the liquids with phenyl groups with refractive index n>1,55, for instance 1,1,5,5-tetraphenyl-1,3,3,5-tetramethyltrisiloxane.

Preferably, the non-conductive liquid is a silicone oil, i.e. a siloxane, having phenyl groups. Such an oil remains long in the liquid state on addition/substitution with more phenyl groups.

The present invention encompasses the use of phenylmethylsiloxane in at least one of the fluid bodies of an electrowetting element, to increase the difference in refractive index between both fluid bodies present in the fluid chamber.

It is in this respect observed in that the not pre-published international patent application nr. IB03/00222 describes a variable focus electrowetting lens, wherein phenylmethylsiloxane is used as a component of the electrically insulating liquid. However adding phenylmethylsiloxane is presented in the previous patent application as an action to give the two liquids present in the fluid chamber preferably an equal density, so that the lens functions are independently of orientation, i.e. without dependence of gravitational effects between the two liquids. The previous patent application does not describe the use of phenylmethylsiloxane in at least one of the fluid bodies present in the fluid chamber of an electrowetting element to increase the difference in refractive index between both fluid bodies.

Figure 4A:
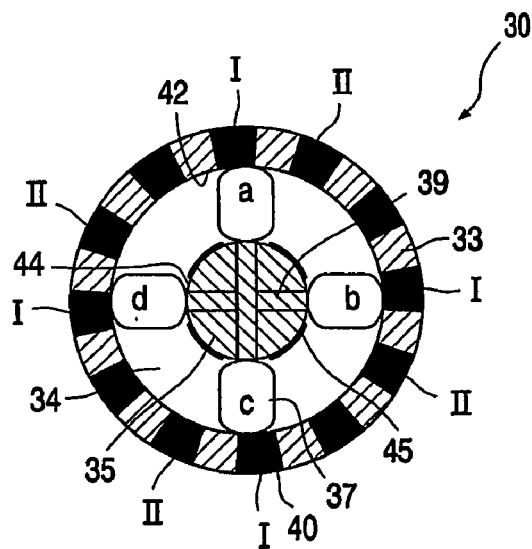
FIGS. 4a and 4b shows, in a cross-sectional view, an activated electrowetting motor at two different time moments.
Figure 4B:
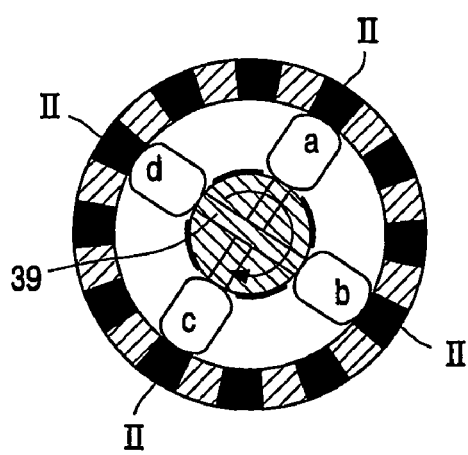

The invention may also be used in an electrowetting motor wherein use is made of the fact that the shape of the interface can be changed by means of an electric force, on the basis of the wetting technique, for manipulating a volume of a fluid along a predetermined path. FIGS. 4A and 4B show a cross-sectional view of an embodiment of such a motor 30, in particular a rotary motor, at differ time moments The motor comprises a substantially cylindrical first body 33 and a substantially cylindrical second body 35, which is concentrically positioned within the first body 33. The first and second body 33, 35 enclose between their respective inner and outer surface a substantially cylindrical chamber 34, which is filled with a non-polar and/or non-conductive first fluid 36, such as an oil, and volumes 37a-d of a polar and/or conductive second fluid 37, in this example an aqueous solution, for instance (salted) water. The fluids 36, 37 are immiscible.

The first body 33 is provided with means for varying the wettability of its inner surface, namely twelve electrodes 40 extending in axial direction of the first body 33, spaced at substantially regular radial intervals along the circumference. The inner surface of the first body 33 is covered with a layer 42 of electrically insulating, hydrophobic material or more generally, a material having a wettability by the second fluid 37 which is lower than the wettability by the first fluid 36. Examples of such material are for instance Teflon-like materials like the amorphous fluoropolymer AF1600 provided by Dupont or parylene or a combination thereof, in case where the first fluid 36 is an oil or air and the second fluid is (salted) water. The electrodes 40 are connected to a voltage supply (not shown).

The second body 35 is of solid design but could be hollow, if so desired, and is mounted movably, in particular rotatably, in the first body 33 by one or more suitable bearings. The or each bearing could for instance be an oil bearing, configured by providing the first and/or second body 33, 35 with an annular groove, in which upon rotation of the second body 35, pressure will build up, centering the second body 35 in the first body 33.

The second body 35 is provided at its outer surface with coupling means in the form of four hydrophilic areas 44, said number corresponding to the number of volumes 37a-d. These areas 44 could for instance be made of or covered by a material having a wettability by the second fluid 37 that is higher than the wettability by the first fluid 36, which material could for instance be glass. The areas 44 are separated from each other in radial direction by areas 45, made of or covered by hydrophobic material, which could be a selection from any of the materials mentioned before. Additionally or alternatively, the hydrophilic areas 44 may be recessed to enhance the coupling force with the volumes. Furthermore, two or more of the volumes 37*a-d* could be interconnected via at least one suitable conduit 39 in second body 35, as illustrated in broken lines in FIGS. 4A and 4B. The areas of high and low wettability 44, 45 may be omitted, but can also be maintained, to increase the maximum force of the motor may exert.

A motor as described above operates as follows. In FIG. 4A the electrodes 40 marked with Roman numerals I (that is the upper, lower, left and right electrodes) are supplied with a voltage. Consequently, the hydrophobic layer 42 covering said electrodes I will become locally hydrophilic. The four volumes 37*a-d* will therefore contact the first body 33 at the four electrodes I. They furthermore contact the second body 35 at the coupling means, that is the hydrophilic areas 44 and the conduits 39. If subsequently the voltage supply is shifted to second electrodes II, situated next tot the former electrodes I, the layer above said second electrodes II will become hydrophilic, whereas the layer above the first electrodes I will switch back to hydrophobic. This gives rise to electrowetting forces which draw the volumes 37*a-d* towards the hydrophilic areas II as shown in FIG. 4B. During this movement the volumes 37*a-d* will move along the hydrophilic area 44 of the second body 35 up to the edge of the hydrophobic area 45. Further movement along the second body 35 will be blocked by the combined action of the hydrophobic area 45 and the first fluid 36, enabling the volumes 37*a-d* to exert a wetting force on the second body 35, which will cause the body 35 to rotate. Hence by sequentially activating successive electrodes 40 I, II with a suitable voltage, the second body 35 can be rotated continuously. Preferably, the electrodes 40 are positioned relatively close to each other or even overlap through a "tooth" structure. Also, the radial dimensions of the electrodes 40 are preferably equal to or smaller than the radial dimensions of the volumes 37*a-d*. Such positioning and/or dimensioning of the electrodes 40 will ensure that the volumes 37*a-d* can "sense" a newly supplied voltage to a succeeding electrode 40 II.

In the given example the rotation is clockwise. It will be appreciated that this direction can be readily reversed by reversing the order in which the electrodes 10 I, II are activated. Obviously, the frequency of rotation will depend on the activation frequency of successive electrodes 40 I, II. It is noted that although in the illustrated example four volumes 37*a-d* of conductive fluid are used, any number of volumes can be used. The volumes 37*a-d* may be line-shaped in axial direction or consist of a series of axially spaced droplets. It is further noted that with the embodiment of FIGS. 4A and 4B, it is also possible to have the first body 33 rotate instead of the second body 35, provided that the first body 33 is rotatable mounted and the second body 35 is fixed. In that case, upon switching the voltage from the first I to the second electrodes II, the volumes 37*a-d* would move towards the second electrodes II (featuring the higher wettability) up till the edge of the hydrophilic area 44. Subsequently, the second electrodes II due to wetting forces would be drawn to the volumes 37*a-d,* causing the first body 33 to rotate anti-clockwise. From this discussion it is also immediately clear that for the operation of the motor 30 it is irrelevant whether the electrodes 40 are positioned on the static body or the movable body. Therefore, although in practice the electrodes 40 will usually be placed on the static body to avoid wiring problems, the presented embodiment should in no way be seen as limiting.

The motor described may suffer from flattening of one of the fluids due to the exerted centrifugal force of the motor, which will influence its performance. According to the invention this can be prevented by using one of the compounds described above, for example one of the compounds of table 1. This table gives also the densities of some compounds.

The present compounds are preferably used as, or in, the non-conducting or non-polar liquid pr fluid. Because most of the compounds have a density larger than water, which is usually the conducting liquid), it will be obvious that said compounds should be mixed with a compound having lower density, to match with the density of water.

Although the description has been limited to an electrowetting lens as an example of an optical electrowetting module, the invention is not in any way limited to such a lens. The invention may be used in any optical electrowetting module, such as a variable-focus lens, a zoom lens, a diaphragm, a filter and a beam deflector.

The invention claimed is:

1. An electrowetting module comprising a fluid chamber, containing at least a first body of a first fluid and a second body of a second fluid, the two bodies being separated by an interface, and means for exerting a force on at least one of the bodies to change a position and/or shape of the interface, wherein at least one of the fluids comprises a compound having at least one aromatic, non-fused, residue and wherein each of the fluids are liquids.

2. The module as claimed in claim 1, wherein the compound having at least one aromatic, non-fused, residue is a compound of formula Ø-R, wherein Ø is a phenyl group, substituted with one or more lower, C1-C5 alkyl groups, and R is a branched C1-C5 alkyl group, being substituted with one or more aryl groups, an aryl group, or a silyl group, substituted with one or more C1-C10 alkyl groups.

3. The module as claimed in claim 1, wherein the compound having at least one aromatic, non-fused, residue is selected from the group consisting of toluene, diphenyl methane and terphenyl.

4. The module as claimed in claim 1, wherein said compound having at least one aromatic, non-fused, residue is phenyl trimethyl silane.

5. The module as claimed in claim 1, wherein said compound having at least one aromatic, non-fused, residue is an organosilicon oxide polymer having structural units of formula $(-R_1R_2Si-O-)_n$, wherein n is an integer from 1 to 10, R1 is an aryl group, being substituted with one or more C1-C10, alkyl groups, R2 is a lower C1-C10 alkyl group, or an aryl group, being substituted with one or more C1-C10 alkyl groups, provided that if n=1, and R1 is a phenyl group, R2 is not a methyl group.

6. The module as claimed in claim 5, wherein said organosilicon oxide polymer is selected from the group consisting of 1,3,3,5-tetraphenyldimethyldisiloxane, 1,1,5,5-tetraphenyl-1,3,3,5-tetramethyltrisiloxane; 1,1,3,5,5-pentaphenyl-1,3,5-trimethyltrisiloxane; triphenyltrimethylcyclotrisiloxane; 3,5,7-triphenylnonamethylpentasiloxane.

7. The module as claimed in claim 1, wherein one of the fluid bodies comprises phenyl methyl siloxane to increase the difference between the refractive indices of the two fluids.

8. The module as claimed in claim 1, configured as an optical component, the first and said second fluid body having different refractive indices, wherein the compound added to one of the fluids has an refractive index difference increasing effect.

9. The module as claimed in claim 8, wherein the first fluid body is electrically conducting and/or polar, and the second fluid body is electrically non-conducting, the module being provided with means for exerting an electric force to change the position and/or shape of the meniscus-shaped interface.

10. The module as claimed in claim 8, wherein the difference in refractive index is from 0,1 to 0,2; the refractive index of said second, non-conducting body being greater than 1.5.

11. The module as claimed in claim 8, wherein said first and said second fluid bodies show a substantially similar density such that the module is substantially insensitive to an orientation of the module.

12. The module as claimed in claim 8, provided with means for exerting a pressure to change the position of the interface.

13. The module as claimed in claim 1, wherein an optical path of the module is not substantially interfered with by the means for exerting the force.

14. The module as claimed in claim 1, wherein the means for exerting the force comprises first and second electrodes, wherein the first electrode is deposed substantially perpendicular to the second electrode.

15. The module as claimed in claim 1, wherein the means for exerting the force comprises a plurality of alternating first and second electrodes deposed along a circumference of a circle.

16. The module as claimed in claim 15, wherein one of the fluids is encapsulated in a plurality of separate volumes.

17. The module as claimed in claim 16, wherein the plurality of separate volumes are joined by a conduit.

18. The module as claimed in claim 16, wherein a radial dimension of the first and second electrodes is equal or less than a radial dimension of the plurality of separate volumes.

* * * * *